(12) United States Patent
Norton et al.

(10) Patent No.: US 8,845,436 B1
(45) Date of Patent: Sep. 30, 2014

(54) LOCATION-BASED MAP GAME MECHANICS

(75) Inventors: Kenneth S. Norton, San Carlos, CA (US); Charles Mendis, Mountain View, CA (US); Taj Jay Campbell, Tokyo (JP)

(73) Assignee: Google Inc., Mountain View, CA (US)

( * ) Notice: Subject to any disclaimer, the term of this patent is extended or adjusted under 35 U.S.C. 154(b) by 310 days.

(21) Appl. No.: 13/442,357

(22) Filed: Apr. 9, 2012

(51) Int. Cl.
*A63F 9/24* (2006.01)

(52) U.S. Cl.
USPC ............................ 463/42; 463/40; 455/457

(58) Field of Classification Search
USPC ............ 463/40, 42; 455/422.1, 456.1, 456.6, 455/457
See application file for complete search history.

(56) References Cited

U.S. PATENT DOCUMENTS

| | | | |
|---|---|---|---|
| 2009/0017913 A1* | 1/2009 | Bell et al. ...................... | 463/40 |
| 2010/0124991 A1* | 5/2010 | O'Sullivan et al. ............. | 463/42 |
| 2011/0275441 A1* | 11/2011 | Wilson ............................ | 463/42 |
| 2012/0244945 A1* | 9/2012 | Kolo et al. ...................... | 463/42 |

* cited by examiner

*Primary Examiner* — Damon Pierce
(74) *Attorney, Agent, or Firm* — Leydig, Voit & Mayer, Ltd.

(57) ABSTRACT

A location-based game is provided in which users with mobile devices leave footprints associated with locations they physically occupy, allowing the users to control and interact with physical locations on computerized maps.

18 Claims, 7 Drawing Sheets

(2 of 7 Drawing Sheet(s) Filed in Color)

LOCATION-BASED MAP GAME MECHANICS

BACKGROUND

1. Field

This field is generally related to a location-based game that incorporates locations of a user of a mobile device.

2. Background

Geo-social networking is a type of social networking in which geographic services and capabilities are used to enable certain social dynamics. User location data can allow social networks to localize services that they provide to users.

For example, services allow location-based social networking that allows interaction with mobile devices, such as GPS-enabled mobile devices such as smartphones.

However, these services rely on discrete check-ins, where a user has to take action to establish their location with respect to landmarks.

BRIEF SUMMARY

An alternative approach to geo-social networking, where the location of the user is recorded periodically over time, represents an approach to geo-social networking that has not been used at present. Embodiments use a location sensor at a mobile device to determine the locations of the mobile device at multiple points in time. These locations determine footprints that cover a computerized map. When a sufficient density of footprint coverage is achieved at an area, the user at the mobile device may be awarded ownership of the area on the computerized map.

A computer-implemented method, system, and computer-readable storage medium provide a location-based game that incorporates locations of a user of a mobile device. These embodiments may operate from the perspective of the mobile device, or from that of a game-hosting server that manages the location-based game.

In an embodiment, a plurality of locations of a user of a mobile device may be received by the game-hosting server, each location associated with a time at which the mobile device occupies that location. A plurality of footprints on a computerized map on the game-hosting server may be identified, the footprints being associated with the plurality of locations and the times at which the user occupied the locations, wherein each footprint has a density score. Density scores associated with the user on the computerized map may be accumulated, wherein a given area on the computerized map has a density score for the user that represents a total of the density scores for the footprints of the user for that area. An indication of ownership of an area on the computerized map may be provided to the user when the accumulated density score of the area exceeds a predetermined density when the area is not currently owned, or exceeds the density associated with a current owner when the area is currently owned.

In an embodiment, a plurality of locations of a user of a mobile device may be determined, using a location sensor coupled to the mobile device, each location associated with a time at which the mobile device occupies that location. The location of the mobile device may be transmitted periodically to a game-hosting server. The game-hosting server performs certain steps. One step is identifying a plurality of footprints of the user on a computerized map on the game-hosting server associated with the plurality of locations and the times at which the user occupied the locations, wherein each footprint has a density score. Another step is accumulating density scores associated with the user on the computerized map, wherein a given area on the computerized map has a density score for the user that represents a total of the density scores for the footprints of the user for that area. A third step is providing an indication of ownership of an area on the computerized map to the user when the accumulated density score of the area exceeds a predetermined density when the area is not currently owned, or exceeds the density associated with a current owner when the area is currently owned.

As noted, embodiments may include methods, systems, and computer readable storage media that operate in accordance with the above description.

Further embodiments, features, and advantages, as well as the structure and operation of the various embodiments are described in detail below with reference to accompanying drawings.

BRIEF DESCRIPTION OF THE FIGURES

The patent or application file contains at least one drawing executed in color. Copies of this patent or patent application with color drawing(s) will be provided by the Office upon request and payment of the necessary fee.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
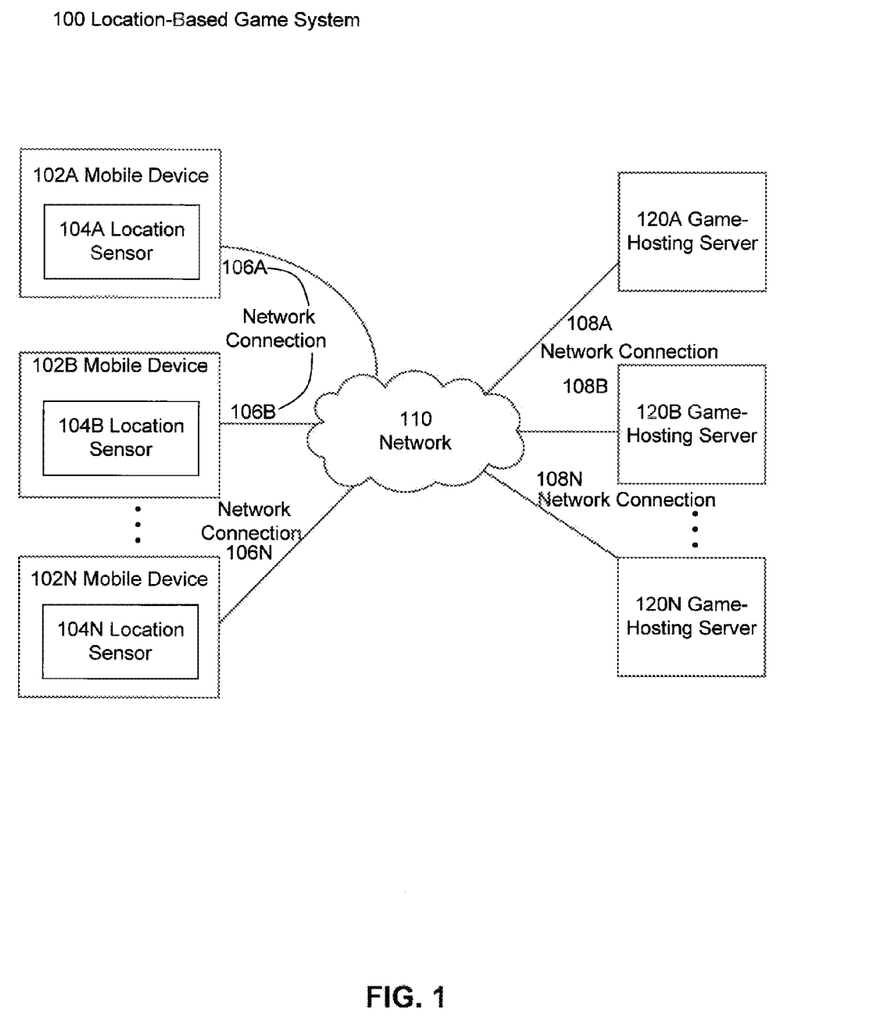
FIG. 1 is a diagram illustrating a system, according to an embodiment.

FIG. 1 is a diagram illustrating a system, according to an embodiment. FIG. 1 illustrates a location-based game system 100. Location-based game system 100 includes one or more mobile devices 102A, 102B . . . 102N. Each of the mobile devices includes a location sensor 104A, 104B . . . 104N, such as a GPS sensor. Location sensors 104A, 104B . . . 104N provide information about the location of the mobile device. For example, location sensors 104A, 104B . . . 104N may provide latitude, longitude, and altitude information for mobile devices 102A, 102B . . . 102N, though other means of describing and storing the location information may be used as well. It may be noted that many potential types of location sensors may be used in embodiments. For example, location sensors 104A, 104B . . . 104N may be a GPS or a device that uses information from a network location service to establish the locations of mobile devices 102A, 102B . . . 102N. However, a GPS or a network location service are only two example ways of establishing the locations of mobile devices 102A, 102B . . . 102N, and other devices may be used to work alone or in combination to establish the locations of mobile devices 102A, 102B . . . 102N.

Mobile devices 102A, 102B . . . 102N are connected to network 110 by network connections 106A, 106B . . . 106N. In embodiments, network connections 106A, 106B . . . 106N may be wireless for convenience, but it is also possible to have embodiments where mobile devices 102A, 102B . . . 102N gather location information over a period of time and upload the information over wired network connections 106A, 106B . . . 106N when connected to network 110. Network 110 then transmits location information for mobile devices 102A, 102B . . . 102N from location sensors 104A, 104B . . . 104N for processing by one or more game-hosting servers 120A, 120B . . . 120N.

Figure 2:
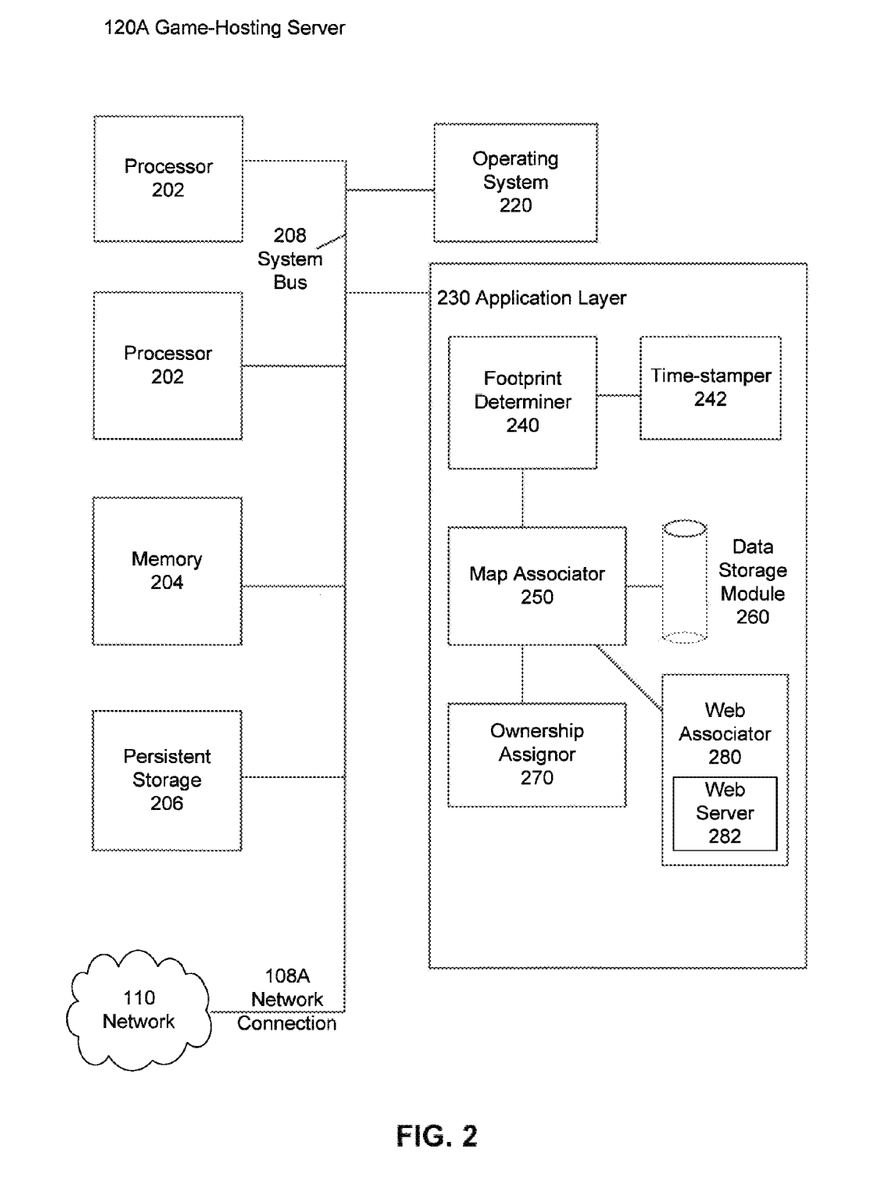
FIG. 2 is another diagram illustrating a system, according to an embodiment.

FIG. 2 is another diagram illustrating a system, according to an embodiment. FIG. 2 illustrates game-hosting server 120A, where the back-end of location-based game system 100 is located.

The diagram of FIG. 2 illustrates game-hosting server 120A that contains a combination of hardware, software, and firmware constituent parts that allow it to run an application layer 230 with access to additional resources over a network 110 via a network connection 108A. Game-hosting server 120A may be a conventional computer such as a desktop or laptop PC, but it may additionally be any web-enabled device that is able to manage data for the location-based game. Game-hosting server 120A as shown in FIG. 2 may be organized around a system bus 208, but any type of infrastructure that allows the hardware infrastructure elements of game-hosting server 120A to communicate with and interact with each other may be used to function as this part of game-hosting server 120A.

The processing task in the embodiment of FIG. 2 is carried out by one or more processors 202A . . . 202N, but it should be noted that any type of processing technology may be used here, including multi-core processors, multiple processors, or distributed processors. Additional specialized processing resources such as graphics, multimedia, or mathematical processing capabilities, either in hardware or in software, may also be used as adjuncts or replacements for processors 202A . . . 202N for certain processing tasks.

In order to manipulate data in an embodiment, processors 202A . . . 202N access a memory 204 via system bus 208. For data that needs to be stored more permanently, processors 202A . . . 202N access a persistent storage 206. Processors 202A . . . 202N, memory 204 and persistent storage 206 operate in conjunction with operating system 220 to provide basic functionality for game-hosting server 120A. Operating system 220 provides support functionality for application layer 230.

Application layer 230 includes several functional subsystems that allow game-hosting server 120A to provide back-end functionality for the location-based game. A footprint determiner 240 receives location information via network connection 108A over network 110 from mobile devices 102A, 102B . . . 102N as determined by location sensors 104A, 104B . . . 104N. For example, footprint determiner 240 may receive a plurality of locations of a user of mobile devices 102A, 102B . . . 102N, each location associated with a time at which the mobile device occupies that location. Incorporating time data may be accomplished by use of time-stamper 242.

These locations can then be used to establish a footprint for mobile device 102A. While the procedure for establishing footprints may vary from embodiment to embodiment, in general establishing a footprint will involve establishing an area on the computerized map based on locations of mobile device 102A at various times. For example, the times may be separated by a predetermined time interval, such as every 15 minutes, or another set time interval.

The locations may then define a footprint, which is associated with a computerized map of the surroundings of the user by map associator 250. Various approaches may be used to define footprints. For example, footprints may take on a variety of shapes which may be defined by three points, such as regions in the shape of a triangle, a half-ellipse, an oval; and so on. In this approach, embodiments track user locations over time and combine information from multiple locations to establish a footprint. For example, the footprints may correspond to a triangle based on locations at a first and third time, with its other vertex at location at a second time between the first and third times. Alternatively, the footprint may cover area by using a paintbrush approach, where the user's location defines a trail that is painted onto the computerized map, the trail determined by using a paintbrush (for example, a circular paintbrush) of a predetermined radius based on the user locations that paints footprints that are indicative of the changing position of the user.

An alternative way to define a footprint is that the three locations may designate one or more city blocks or landmarks that are within a certain preset proximity to the three locations and designate them as being the location of the footprint. For example, the three points may define a triangle, and blocks and locations that overlap with the triangle may be considered as being part of the footprint.

After footprint determiner 240 establishes where the footprints are, it is the role of map associator 250 to manage associating density with the footprints. As part of the operation of map associator 250, the density score associated with a footprint may vary according to at least one of the size of the footprint and the time spent occupying it. For example, a user may accrue density at a set rate of 100 density units per hour. The density score associated with a footprint varies based on size in that the larger the size of the footprint, the less dense the footprint will be. Thus, for a footprint area of 10 area units, if the user was judged to have occupied the area for half-an-hour, a footprint of 50 density units would be spread over the footprint, resulting in an average density of 5 density units/area unit in the footprint. On the other hand, a footprint area of 20 area units, under similar conditions, would have an average density of 2.5 density units/area unit in the footprint. Information associated by map associator 250 is archived in data storage 260.

Data storage 260 stores computerized maps and information about user locations. It may be a relational database in certain embodiments, but in general any permanent data storage configuration that allows for persistent storage of maps and location information may be used.

Footprint determiner 240 is also connected to a time-stamper 242. Time-stamper 242 stores the time at which a footprint is stored in data storage 260. The time data stored by time-stamper 242 allows the game-hosting server 120A to provide at map associator 250 and data storage 260 that the footprint decays over time, such as linear or exponential decay. Time-stamper 242 may store all three of the times associated with a footprint, or a specific one of the times associated with a footprint. The timing information provided by time-stamper 242 also may be used by map associator 250 to aid in the process of determining how to manage and accumulate density. For example, as discussed density scores may accrue at a set rate, and hence time-stamper 242 helps ensure that map associator 250 associates the proper density scores with footprints established by footprint determiner 240.

As areas on the computerized map are covered with footprints, the footprints will begin to overlap. For example, an area may be covered by three overlapping footprints, one of a density of 3 density units/area unit, one of a density of 2 density units/area unit, and one of a density of 4 density units/area unit. Thus, the area where all three overlap has a combined density of 9 density units/area unit. Part of the role of map associator 250 is to manage this overlap, such that as the user leaves footprints, given areas on the computerized map have density scores for each user that represent a total of the density scores for the footprints of the user for that area.

Ownership assignor 270 assigns ownership of various areas on the computerized map to users based on footprints. It operates in conjunction with map associator 250 to accomplish the assigning. For example, there may be a minimum density to own an area, for example, 6 density units/area unit. In this situation, an area with a footprint of 7 density units/area unit would be considered owned by the user associated with those footprints.

However, ownership belongs to the user with the greatest footprint density in an area. For example, a user might have a density of 8 density units/area unit in an area, but even if this density exceeded the minimum density for ownership, ownership would not transfer until the user exceeded the density of the current owner. For example, ownership would not transfer if the current owner had a density of 9 density units/area unit.

Additionally, application layer 230 may host a web associator 280 that executes a web server 282. Web associator 280 determines if there are any web sites affiliated with landmarks in the geographical vicinity of the user, and allows access to them over web server 282. Web associator 280 also provides certain other functionality, as discussed below. In general, the role of web associator 280 is to help manage user interaction with web sites that are related to physical locations that the user occupies. Web server 282 helps ensure that mobile devices 102A, 102B . . . 102N have access to the associated web sites that web associator 280 provides.

Location-based game system 100 may use network connections 106A, 106B . . . 106N and 108A, 108B . . . 108N to establish communication between mobile devices 102A, 102B, 102N and game-hosting servers 120A, 120B . . . 120N via network 110. Network connections 106A, 106B . . . 106N and 108A, 108B . . . 108N may be a wired connection such as Ethernet, token ring, or optical, DSL, cable, or phone connections in conjunction with an appropriate modem. However, appropriate wireless technology may be a convenient means to provide part of network 110, especially the network connections 106A, 106B . . . 106N between mobile devices and network 110.

Network 110 may be the Internet, a local area network, or any other network 110 of machines that allow data exchange for the location-based game. Network 110 should also allow access at mobile devices 102A, 102B . . . 102N to nearby web sites provided by web associator 280 and web server 282.

Each of the constituent parts of a system embodiment may be implemented in hardware, software, firmware, or any combination thereof. Likewise, modules or instructions that constitute operative parts of embodiments may utilize any type of structured memory, including a persistent memory. In examples, each data storage infrastructure may be implemented as a relational database.

It should be noted that computer-readable medium embodiments may include any physical medium that is capable of encoding instructions that may subsequently be used by one or more processors to implement methods described herein. Example physical media may include floppy discs, optical discs (e.g. CDs, mini-CDs, DVDs, HD-DVD, Blu-ray), hard drives, punch cards, tape drives, flash memory, and memory chips. However, any other type of tangible, persistent storage that can serve in the role of providing instructions to one or more processors may be used to store the instructions in these embodiments.

Overview of the Method

Figure 3:
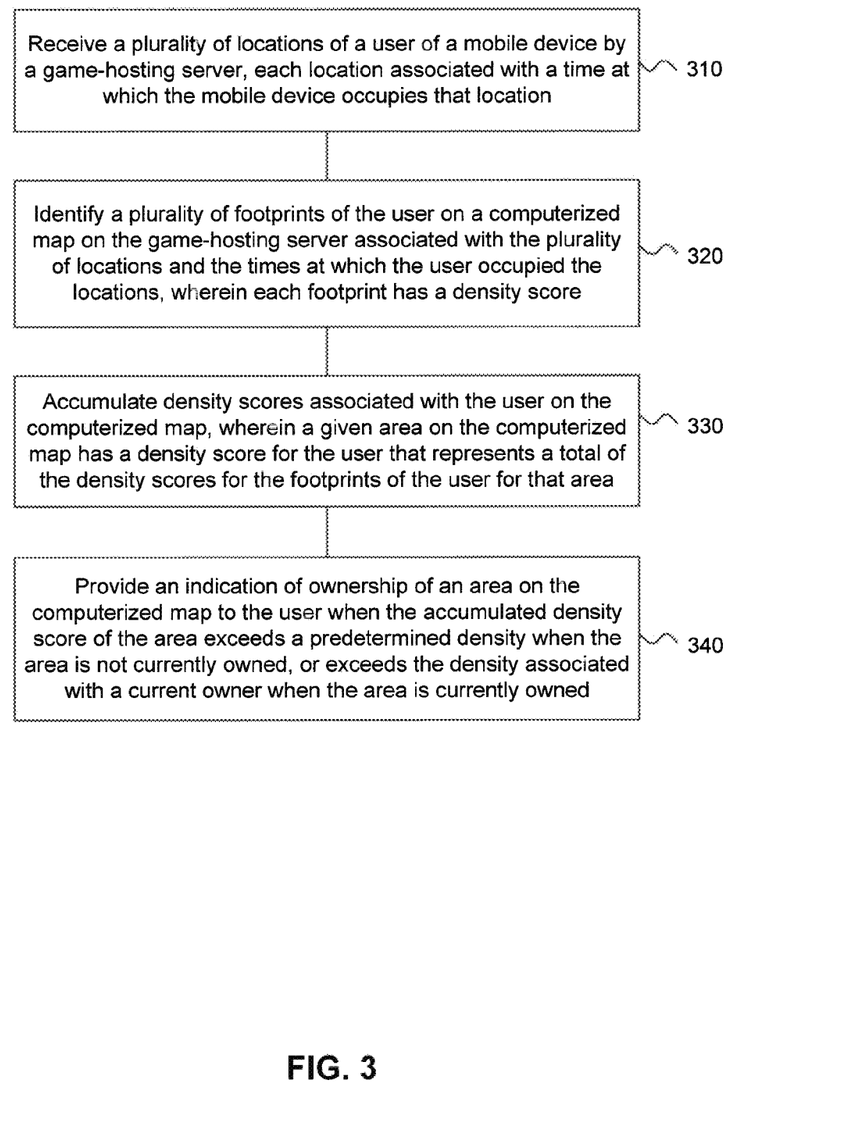
FIG. 3 is a flowchart of a method, according to an embodiment.

FIG. 3 is a flowchart of a method, according to an embodiment. It is an embodiment from the perspective of a game-hosting server.

In stage 310, a plurality of locations of a user of a mobile device may be received by the game-hosting server, each location associated with a time at which the mobile device occupies that location. For example, footprint determiner 240 on game-hosting server 120A may receive locations from mobile device 102A and location sensor 104A and incorporate information from time-stamper 242.

In stage 320, a plurality of footprints on a computerized map on the game-hosting server may be identified, the footprints being associated with the plurality of locations and the times at which the user occupied the locations, wherein each footprint has a density score. For example, footprint determiner 240 may use information from time-stamper 242 and the location information received in stage 310 to establish footprints on a computerized map. It may also interact with a source of map information, such as map associator 250 and/or data storage module 260, to access map information that may be combined with the user location information so as to establish the relationship between user locations and maps of areas that include these locations.

In stage 330, density scores associated with the user on the computerized map may be accumulated, wherein a given area on the computerized map has a density score for the user that represents a total of the density scores for the footprints of the user for that area. For example, map associator 250 may use map information, which may be stored in data storage module 260, to use information about footprints, established as discussed in stage 320, in combination with timing information from time-stamper 242, to accumulate density scores on the computerized map.

In stage 340, an indication of ownership of an area on the computerized map may be provided to the user when the accumulated density score of the area exceeds a predetermined density when the area is not currently owned, or exceeds the density associated with a current owner when the area is currently owned. For example, ownership assignor 270 may use the densities provided in stage 340 in combination with additional information from map associator 250 and data storage module 260 to monitor when ownership needs to be changed. As discussed elsewhere, a change in ownership occurs when the accumulated density score of the area exceeds a predetermined density when the area is not currently owned, or exceeds the density associated with a current owner when the area is currently owned.

Figure 4:
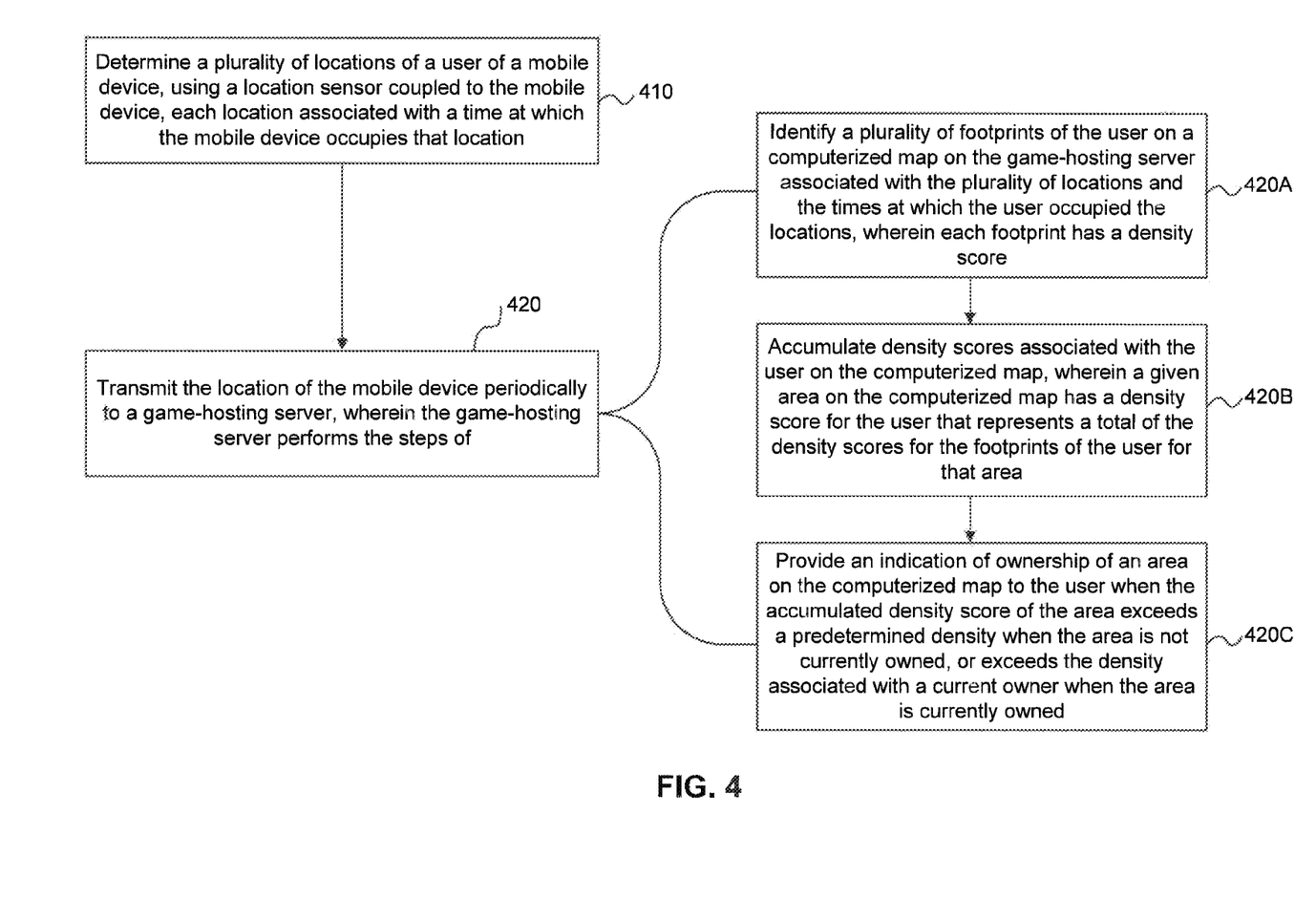
FIG. 4 is a flowchart of a method, according to an embodiment.

FIG. 4 is a flowchart of another exemplary method, according to an embodiment. It is an embodiment from the perspective of the mobile device.

In stage 410, a plurality of locations of a user of a mobile device may be determined, using a location sensor coupled to the mobile device, each location associated with a time at which the mobile device occupies that location. As discussed above, a location sensor may be a GPS, a device that establishes the location of the mobile device from a network location service, or another type of sensor that gathers information to establish the location of the mobile device. For example, for mobile device 102A, location sensor 104A may determine the plurality of locations.

In stage 420, the location of the mobile device may be transmitted periodically to a game-hosting server. The game-hosting server performs certain stages, referred to as stages 420A-420C. Location sensor 104A may be configured to do this transmitting, or a dedicated transmitter may do the transmitting. The location may be transmitted periodically in the sense that embodiments may vary in terms of how the transmission of location information is timed. For example, one embodiment may transmit each location immediately as it is determined, but another embodiment may store a series of locations and transmit them as a batch at regular intervals. Hence, transmitting periodically includes these example approaches, and may further include other approaches that ensure that the locations from stage 410 can be received by the game-hosting server.

Stage 420A includes identifying a plurality of footprints of the user on a computerized map on the game-hosting server associated with the plurality of locations and the times at which the user occupied the locations, wherein each footprint has a density score. For example, footprint determiner 240 may use information from time-stamper 242 and the location information received in stages 410 and 420 to establish footprints on a computerized map. It may also interact with a source of map information, such as map associator 250 and/or data storage module 260, to access map information that may be combined with the user location information so as to establish the relationship between user locations and maps of areas that include these locations.

Stage 420B includes accumulating density scores associated with the user on the computerized map, wherein a given area on the computerized map has a density score for the user that represents a total of the density scores for the footprints of the user for that area. For example, map associator 250 may use map information, which may be stored in data storage module 260, to use information about footprints, established as discussed in stage 320, in combination with timing information from time-stamper 242, to accumulate density scores on the computerized map.

Stage 420C includes providing an indication of ownership of an area on the computerized map to the user when the accumulated density score of the area exceeds a predetermined density when the area is not currently owned, or exceeds the density associated with a current owner when the area is currently owned. For example, ownership assignor 270 may use the densities provided in stage 340 in combination with additional information from map associator 250 and data storage module 260 to monitor when ownership needs to be changed. As discussed elsewhere, a change in ownership occurs when the accumulated density score of the area exceeds a predetermined density when the area is not currently owned, or exceeds the density associated with a current owner when the area is currently owned.

Examples of Use

Figure 5:
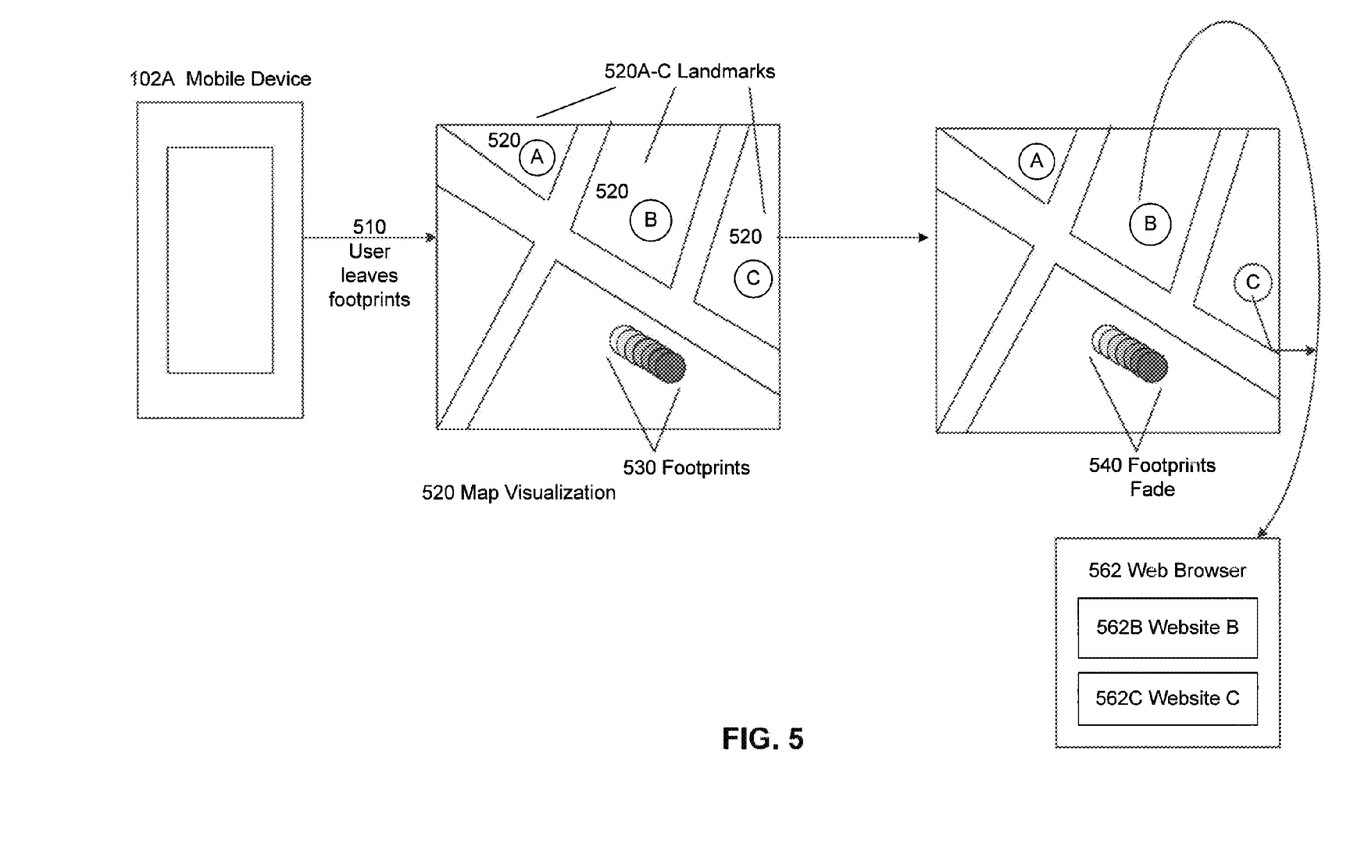
FIG. 5 is a diagram of successive use cases, according to an embodiment.

FIG. 5 is a diagram of successive use cases, according to an embodiment. FIG. 5 begins with an illustration of mobile device 102A, which begins the use case when a user leaves footprints 510 as the user traverses the map. A map visualization 520 is provided, which shows landmarks 520A-520C. Map visualization 520 also shows footprints 530. The footprints reflect a progression from northwest to southeast, with darker footprints (in this embodiment) representing a greater density.

FIG. 5 demonstrates several features of certain embodiments. First, the footprints are provided as a continuous trail of circular dots (reflecting the paintbrush approach to footprints, discussed above) that reflect the changing location over time of the user. Next, the footprints fade over time 540. In the embodiment where the footprints fade over time, a user must return to an area to replenish density as the footprints fade. Ownership assignor 270 may be configured to remove ownership of areas as the footprints fade over time. Another feature illustrated in FIG. 5 is the use of web browser 562. Web browser 562 will generally be located on mobile device 102A to receive data from web associator 280 and web server 282. As can be seen, web browser 562 allows access to web sites 562B and 562C, which are websites associated with landmarks 520B and 520C. Access to web sites associated with nearby landmarks is discussed below.

Figure 6:
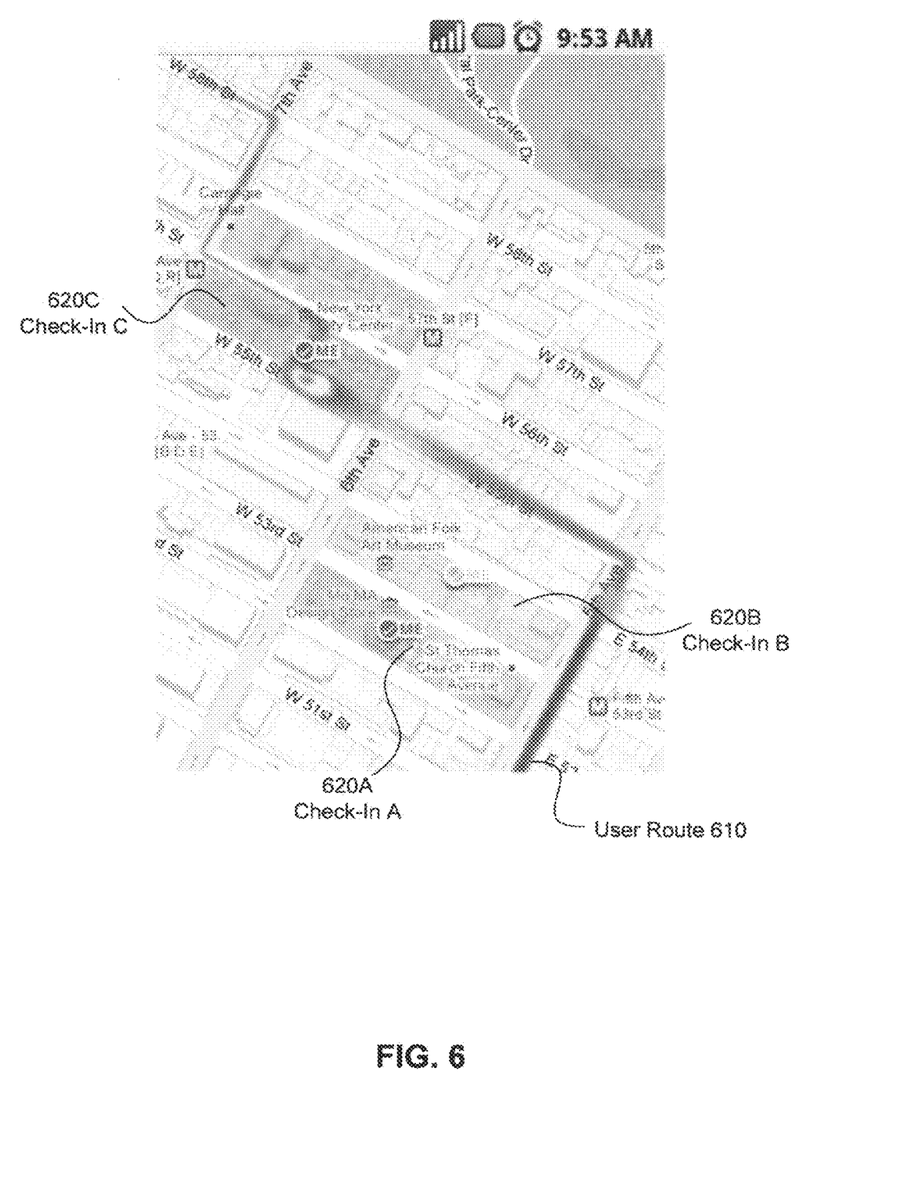
FIG. 6 is a screenshot of an embodiment.

FIG. 6 is a screenshot of an embodiment. FIG. 6 shows a user route 610 through the streets of New York City. The user starts near Carnegie Hall on W $58^{th}$ Street, proceeds towards New York City Center on W $55^{th}$ Street, then travels on W $55^{th}$ Street past $6^{th}$ Avenue to $5^{th}$ Avenue, turns right on $5^{th}$ Avenue, and heads south past E $53^{rd}$ Street. Thus, the overall route proceeds from northwest to southeast.

FIG. 6 shows examples of how coloration of the map may be indicative of characteristics of how the travel of the user proceeds. In general, the user's route is shown in blue as the user travels over the map. Spots in colors closer to the red end of the spectrum, such as the spot in green, yellow, and red near the New York City Center on W $55^{th}$ Street, reflect that the user has spent additional amounts of time at these places, and indicate that the user's presence there is contributing to greater density and ownership of these areas. For example, because the user spent additional time near the New York City Center, the user has gained ownership of the block containing the New York City Center.

Several additional things can be observed from FIG. 6. First, it can be seen that the user has achieved ownership of several blocks and landmarks. For example, at check-in 620A, the user has achieved ownership of the blocks marked in red, with the MoMA Design Store. At check-in 620B, the user has achieved ownership of the block with the American Folk Art Museum. Additionally, at check-in 620C, the user has achieved ownership of the block with the New York City Center. The user has spent time at without gaining ownership of blocks marked in blue, such as those with St. Thomas Church Fifth Avenue and Carnegie Hall.

FIG. 6 also shows how varying amounts of time lead to various footprint densities. The visual depiction of the fading of the route of the user over time may portray areas with greater density such that the saturation of the color of the route fades over time, as in FIG. 5. Given the assumption that more saturated footprints reflect a longer time spent in the footprint, it can be seen that the user spent a longer time at check-in 620A than at 620B. FIG. 6 also shows how footprints fade over time, in that the area where the user began, at check-in 620C, is generally less saturated than where the user ended. This shading discrepancy reflects that the footprints may fade over time, based on the time-stamps. However, it is to be noted that an area near New York City Center at W $55^{th}$ Street is colored in green, yellow, and red, indicating that the user spent a great deal of time there.

Figure 7:
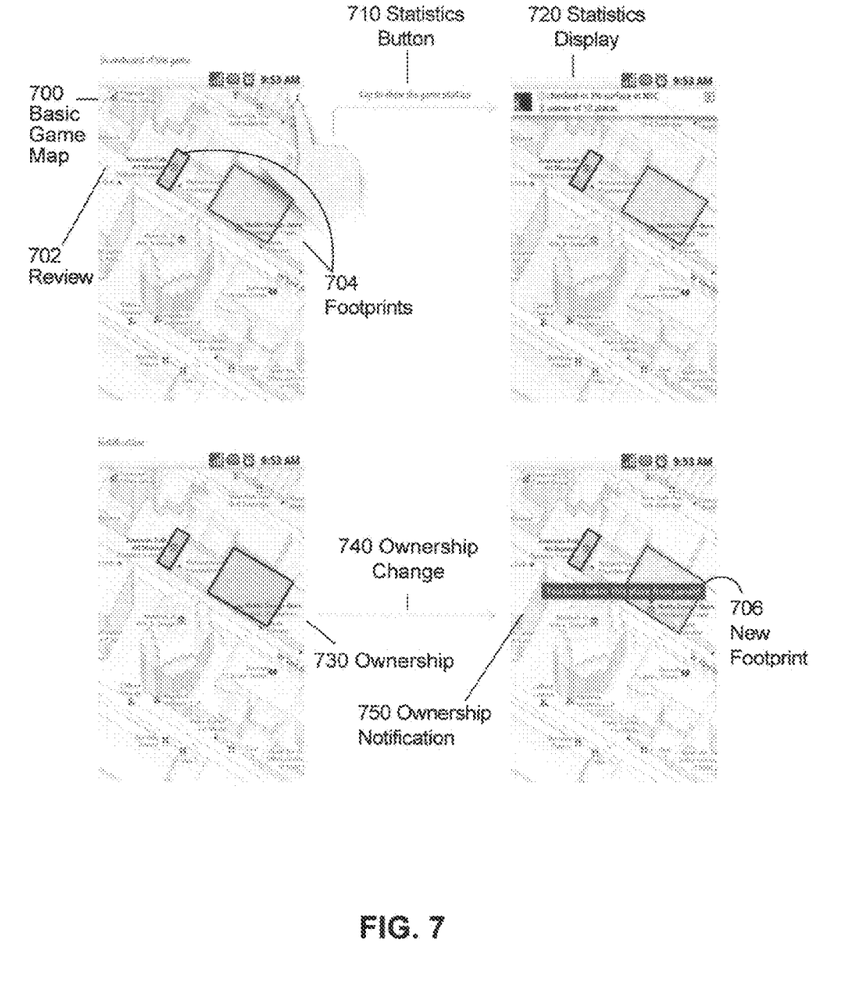
FIG. 7 illustrates additional screenshots of an exemplary embodiment.

FIG. 7 illustrates additional screenshots of an embodiment. FIG. 7 provides a screenshot of a basic game map 700. The map features a few examples of how embodiments operate.

For example, the American Folk Art Museum, in the northwest corner of the game map 700, has a review 702 associated with it (reviews are discussed further, below). In addition, the map features two footprints 704 that are associated with the user. The footprints reflect an embodiment where footprints are chosen to correspond to pre-defined areas, such as areas associated with selected buildings or other areas. In the eastern footprint is the MoMA Design Store, which notes that the user has checked in by automatically leaving a footprint.

Another feature that FIG. 7 illustrates is the statistics button 710 (which may be a physical button, a virtual button, or any other type of functional control). When statistics button 710 is activated, a statistics display appears with information about the map-based game, such as about how much of the map has been covered and how many places the user owns.

Additionally, FIG. 7 demonstrates how ownership is used. In FIG. 7, 730 shows that MoMA Design Store was owned by "Jonah". However, the new footprint 706 is dense enough to lead to an ownership change 740. Thus, ownership changes and mobile device 102A provides the user with an ownership notification 750.

Additional Features

Additional embodiments may provide support for other functionality that enhances the usefulness of the embodiments. One feature, as discussed partially above, is that web associator 280 and web server 282 may enable the user of the mobile device to interact with a web site associated with a location in the current footprint. For example, the current footprint may include a coffee shop and a bookstore. Embodiments may facilitate the ability of the user to interact with the web sites for the coffee shop and the bookstore.

Furthermore, certain embodiments may provide that the density score of a footprint may vary based on the content of interactions that the user has with the web sites associated with the locations in the footprints of the user. For example, suppose that the user interacts with the web site of a bookstore. There may be a promotion that if the user orders a certain mystery book, then the embodiment may change the way in which density scoring is amassed. For example, users who buy the mystery book may earn density score twice or three times as fast, or there may be one or more bonus footprints that reflect the purchase by the user. Thus, certain actions can help users take over certain areas faster, potentially offering an incentive for such actions.

Another task that certain embodiments can facilitate is rating and reviewing. When the user visits a location in the current footprint, an embodiment may enable the user of the mobile device to perform at least one of rating or reviewing a location in the current footprint. For example, suppose that the user visits an Indian restaurant in the footprint. Then, the user may be allowed to rate the restaurant, for example on a numerical score, a letter grade, or a number of stars or diamonds or any other rating scale that indicates quality. An embodiment may also allow rating for different aspects of the experience, such as food quality and service quality. The user may also be allowed to associate a descriptive review with the restaurant.

In an embodiment, users are provided with rewards based on the location of footprints, and areas that the user owns. First, users may be rewarded for simply traversing various areas. For example, if the user travels across Central Park, the user may be provided with a coupon for use at a hot dog stand. Alternatively, users may receive additional awards for achieving ownership of various areas. For example, a user who spends a sufficient amount of time in a concentrated enough area may achieve ownership at a store, such as a jewelry store, and receive a special reward. Thus, there may be tiers of rewards, such that all game players who visit the jewelry store receive 10% off, but the user who achieves ownership receives a 25% off discount. By using rewards as positive reinforcement, locations can help condition certain behaviors from players of the game.

It should be noted that users may not want personal information divulged by such a geo-social game. Therefore, it is desirable to provide users with a privacy warning to obtain their informed consent before they use embodiments, so that users who are unwilling to accept the privacy trade-offs inherent to use of these embodiments do not participate. It is also to be noted that the user may turn the game on and off, so that they may opt to leave footprints at certain times, but not do so when the user wishes to protect privacy or otherwise does not want their location accounted as part of the location-based game.

These embodiments offer several advantages over current geo-social games. Because the location of the user is tracked automatically, the user leaves a trail of footprints without requiring active intervention by the users. The footprints establish ownership of areas for users, enabling them to facilitate interaction with places simply by traveling there.

Additionally, more specialized features of embodiments offer advantages. For example, the time-stamping feature can require users to repeatedly visit places to maintain ownership, which can be very helpful in encouraging repeat visits from users.

CONCLUSION

The Summary and Abstract sections may set forth one or more but not all embodiments as contemplated by the inventor(s), and thus, are not intended to limit the present disclosure and the appended claims in any way.

The present embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described embodiments, but should be defined only in accordance with the following claims and their equivalents.

What is claimed is:

1. A computer-implemented method, comprising:
    receiving, by a server device, data corresponding to a plurality of locations of a mobile device, wherein each location in the plurality of locations is associated with a timestamp corresponding to a time at which the mobile device occupies the location;

computing, by the server device, a first density score for a first area on a computerized map based on the plurality of locations, wherein computing the first density score for the first area includes calculating a ratio of a size of the first area and an amount of time that the mobile device occupied the first area;

computing, by the server device, a second density score for a second area on the computerized map based on the plurality of locations, wherein computing the second density score for the second area includes calculating a ratio of a size of the second area and an amount of time that the mobile device occupied the second area;

identifying, by the server device, a third area on the computerized map that overlaps a portion of the first area and a portion of the second area;

computing, by the server device, a third density score for the third area, wherein the third density score is based on a sum of the first density score and the second density score; and responsive to determining that no indication of ownership is associated with the third area and that the third density score exceeds a predetermined density score, transmitting an indication of ownership of the third area to the mobile device.

2. The computer-implemented method of claim 1, wherein the first density score for the first area is further based on content of interactions that the mobile device has with one or more web sites associated with landmarks included in the first area.

3. The computer-implemented method of claim 1, further comprising:
receiving at least one of a rating or a review of a landmark included in the first area, wherein the first density score for the first area is further based on the at least one of the rating or the review.

4. The computer-implemented method of claim 1, wherein the first density score decays as time passes after a timestamp of a location associated with the first area.

5. The computer-implemented method of claim 1, further comprising:
transmitting an indication of a reward to the mobile device based on the indication of ownership of the third area.

6. The computer-implemented method of claim 1, wherein a map displayed on the mobile device provides a visualization of the first area and the second area.

7. A non-transitory computer-readable storage medium having computer-executable instructions stored thereon that, when executed by one or more processors, cause the one or more processors to execute operations, the operations comprising:
receiving, by a server device, data associated with a plurality of locations of a mobile device, wherein each location in the plurality of locations is associated with a timestamp corresponding to a time at which the mobile device occupies the location;

computing, by the server device, a first density score for a first area on a computerized map based on the plurality of locations, wherein computing the first density score for the first area includes calculating a ratio of a size of the first area and an amount of time that the mobile device occupied the first area;

computing, by the server device, a second density score for a second area on the computerized map based on the plurality of locations, wherein computing the second density score for the second area includes calculating a ratio of a size of the second area and an amount of time that the mobile device occupied the second area;

identifying, by the server device, a third area on the computerized map that overlaps a portion of the first area and a portion of the second area;

computing, by the server device, a third density score for the third area, wherein the third density score is based on a sum of the first density score and the second density score; and responsive to determining that no indication of ownership is associated with the third area and that the third density score exceeds a predetermined density score, transmitting indication of ownership of the third area to the mobile device.

8. The computer-readable storage medium of claim 7, wherein the first density score for the first area is further based on content of interactions that the mobile device has with one or more web sites associated with landmarks included in the first area.

9. The computer-readable storage medium of claim 7, wherein the operations further comprise:
receiving at least one of a rating or a review of a landmark included in the first area, wherein the first density score for the first area is further based on the at least one of the rating or the review.

10. The computer-readable storage medium of claim 7, wherein the first density score decays as time passes after a timestamp of a location associated with the first area.

11. The computer-readable storage medium of claim 7, further comprising:
transmitting an indication of a reward to the mobile device based on the indication of ownership of the third area.

12. The computer-readable storage medium of claim 7, wherein a map displayed on the mobile device provides a visualization of the first area and the second area.

13. A system, comprising:
a mobile device configured to detect a plurality of locations of the mobile device, wherein each location in the plurality of locations is associated with a timestamp corresponding to a time at which the mobile device occupies the location; and a server device, configured to:
receive data corresponding to the plurality of locations;
compute a first density score for a first area on a computerized map based on the plurality of locations, wherein computing the first density score for the first area includes calculating a ratio of a size of the first area and an amount of time that the mobile device occupied the first area;
compute a second density score for a second area on the computerized map based on the plurality of locations, wherein computing the second density score for the second area includes calculating a ratio of a size of the second area and an amount of time that the mobile device occupied the second area;
identify a third area on the computerized map that overlaps a portion of the first area and a portion of the second area;
compute a third density score for the third area, wherein the third density score is based on a sum of the first density score and the second density score; and
responsive to determining that no indication of ownership is associated with the third area and that the third density score exceeds a predetermined density score, transmit an indication of ownership of the third area to the mobile device.

14. The system of claim 13, wherein the first density score for the first area is further based on content of interactions that the mobile device has with one or more web sites associated with landmarks included in the first area.

15. The system of claim 13, wherein the server device is further configured to:
receive at least one of a rating or a review of a landmark included in the first area from the mobile device, wherein the first density score for the first area is further based on the at least one of the rating or the review.

16. The system of claim 13, wherein the first density score decays as time passes after a timestamp of a location associated with the first area.

17. The system of claim 13, wherein the server device is further configured to:
transmit an indication of a reward to the mobile device based on the indication of ownership of the third area.

18. The system of claim 13, wherein the mobile device is further configured to:
cause a map to be displayed that provides a visualization of the first area and the second area.

* * * * *